(No Model.)
F. G. & A. C. SARGENT.
CONVEYER.
No. 527,723.
4 Sheets—Sheet 1.
Patented Oct. 16, 1894.
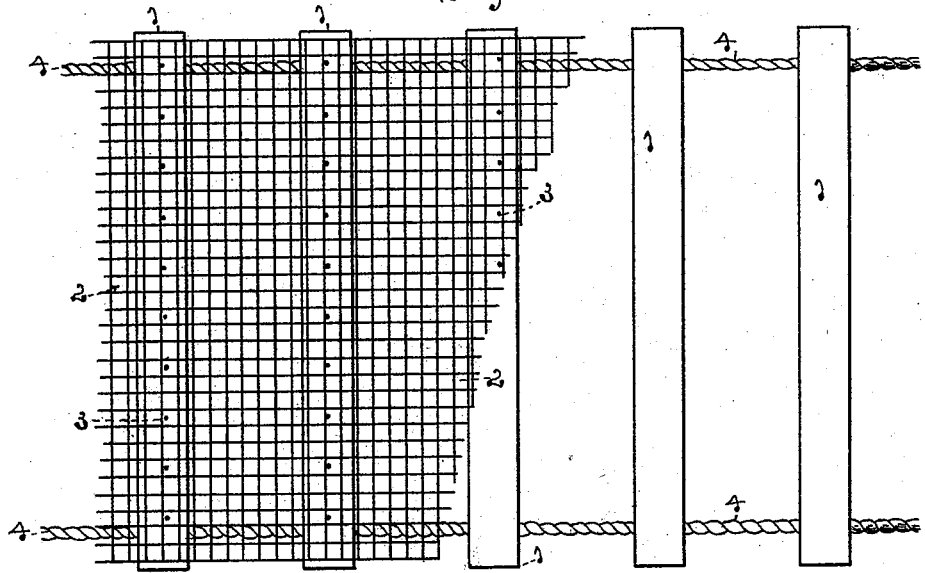
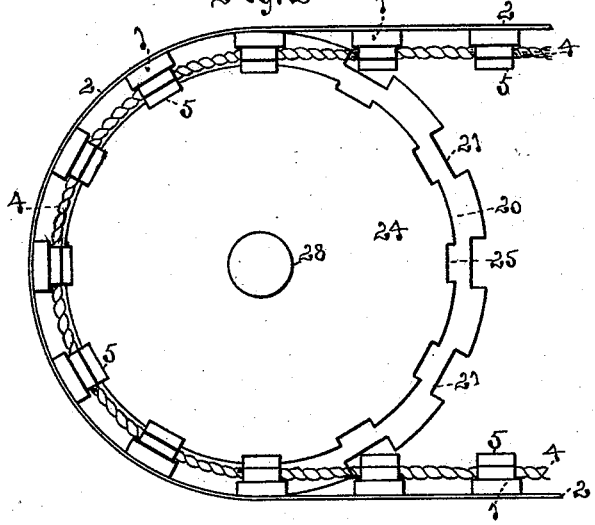
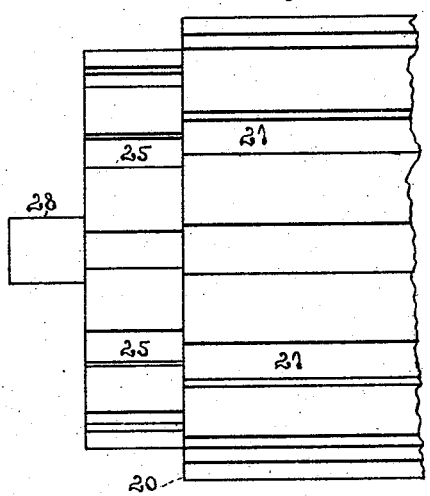
Witnesses
N. P. Ockington
Andrew H. Paton
Inventors:
Frederick G. Sargent
Allan C. Sargent
By Lepine Hall Rice
Attorney.

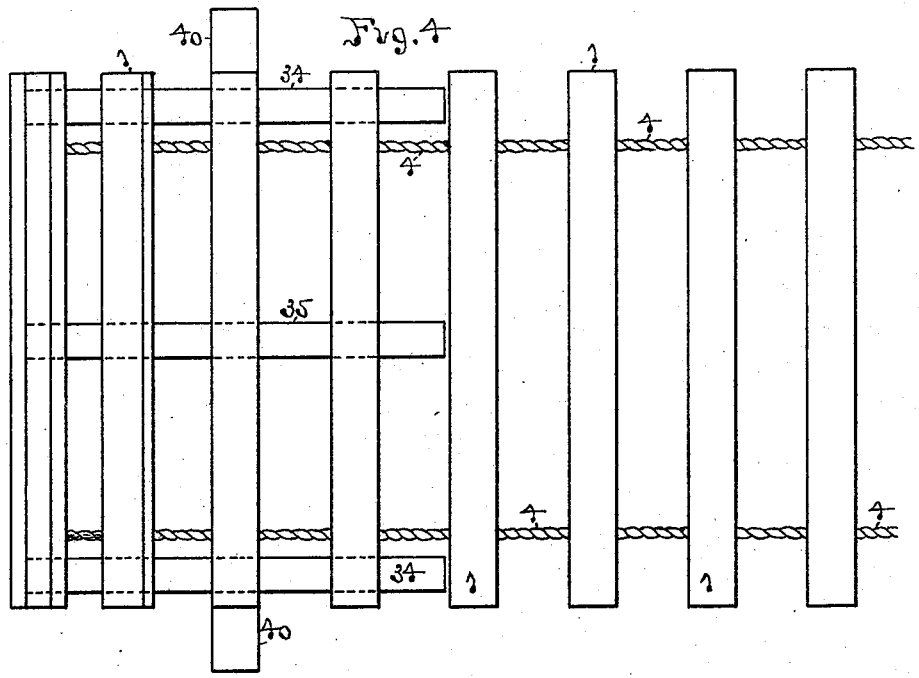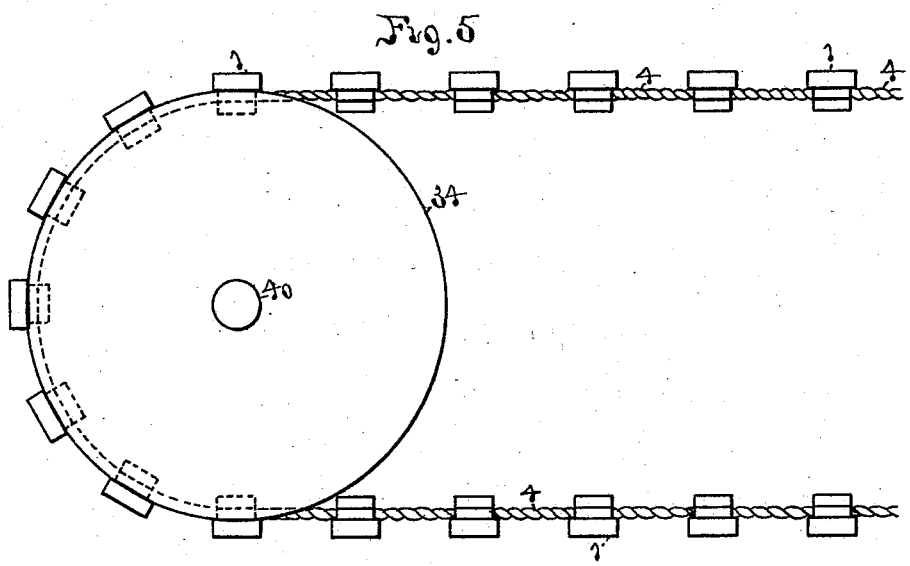

(No Model.) 4 Sheets—Sheet 3.
F. G. & A. C. SARGENT.
CONVEYER.
No. 527,723. Patented Oct. 16, 1894.
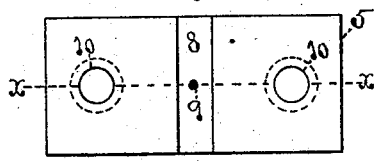
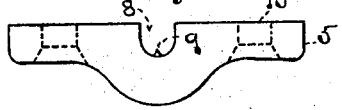
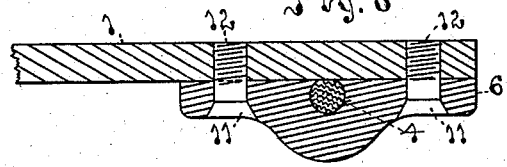
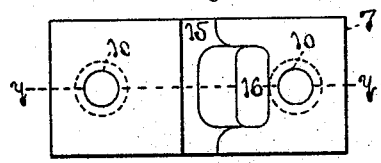
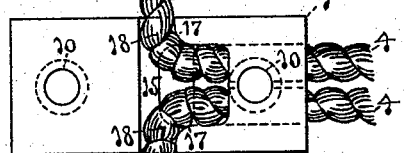
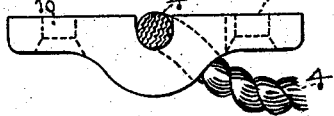
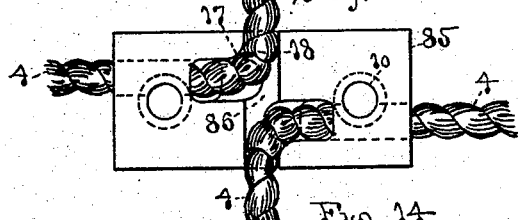
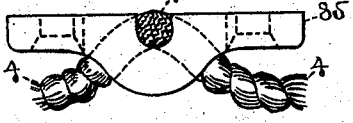
Witnesses
N. P. Ockington
Andrew H. Paton
Inventors;
Frederick G. Sargent
Allan C. Sargent
By Lepine Hall Rice
Attorney.

(No Model.)  F. G. & A. C. SARGENT.  4 Sheets—Sheet 4.
CONVEYER.
No. 527,723.  Patented Oct. 16, 1894.
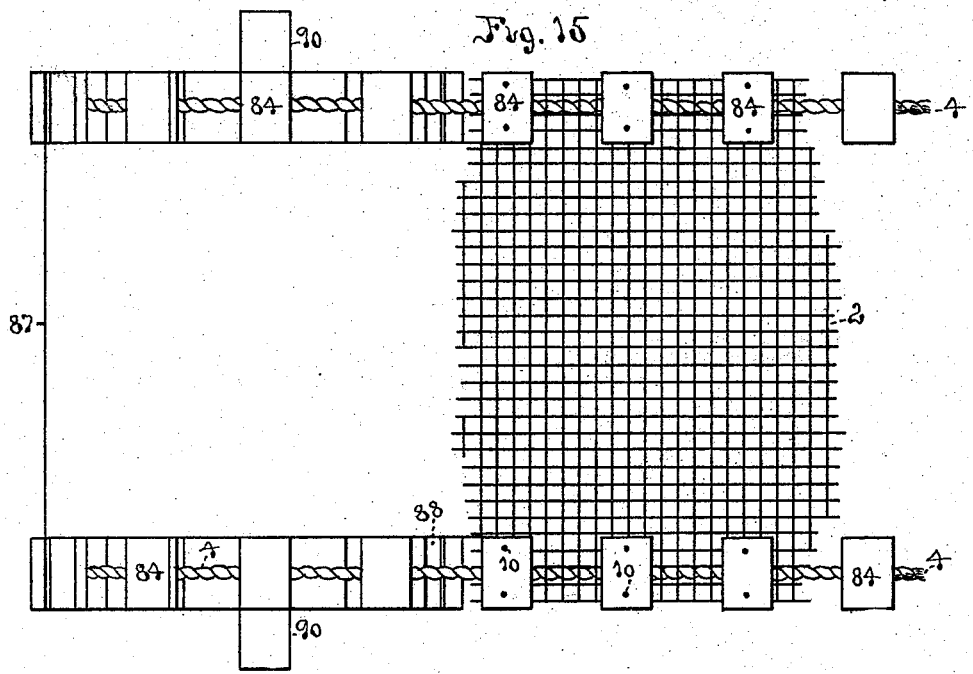
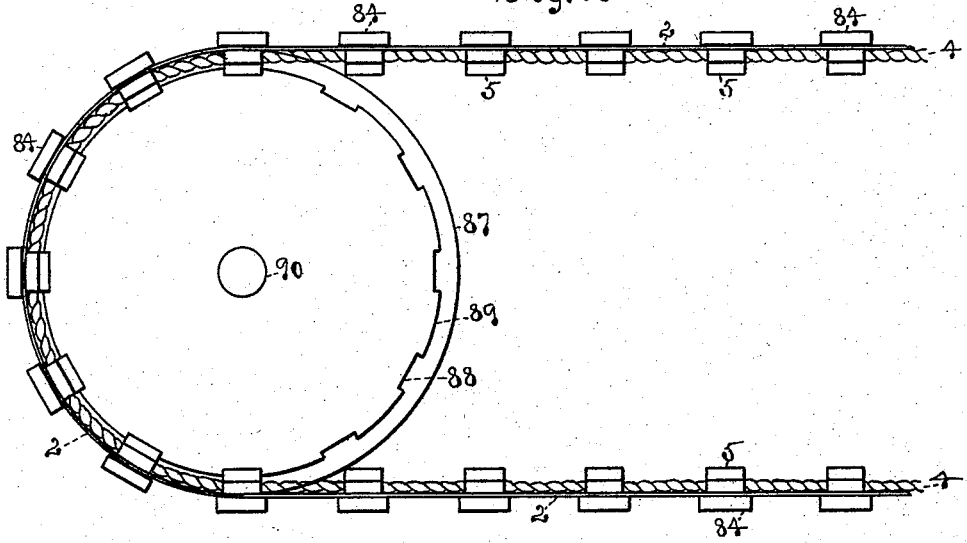
Witnesses
N. P. Ockington
Andrew H. Paton
Inventors:
Frederick G. Sargent
Allan C. Sargent
By Lepine Hall Rice
Attorney.

UNITED STATES PATENT OFFICE.

FREDERICK G. SARGENT AND ALLAN C. SARGENT, OF GRANITEVILLE, MASSACHUSETTS.

CONVEYER.

SPECIFICATION forming part of Letters Patent No. 527,723, dated October 16, 1894.

Application filed March 29, 1894. Serial No. 505,580. (No model.)

*To all whom it may concern:*

Be it known that we, FREDERICK G. SARGENT and ALLAN C. SARGENT, of Graniteville, in the county of Middlesex and State of Massachusetts, have invented a new and useful Improvement in Conveyers, of which the following is a specification.

Our invention relates to conveyers, and it consists in certain new and useful constructions and combinations of the parts thereof, substantially as hereinafter described and claimed.

In the drawings:—Figure 1 is a top view of a conveyer furnished with our improvement, the wire apron or netting being broken away to show the slats and cable more clearly. Fig. 2 is an end view of one of the pulleys or rollers over which this conveyer runs. Fig. 3 is a side view of one end of the roller. Fig. 4 is a top view of another form of conveyer, showing the pulleys arranged differently. Fig. 5 is a side view of the same. Fig. 6 is a view of one form of fastener, the line of sight coinciding with the line of the cable. Fig. 7 is a top view of the same. Fig. 8 is a section of the same, on the line $x$—$x$ of Fig. 7, but without any projection in its groove, showing the method of attachment to the slat. Fig. 9 is a top view of a form of fastener to be used where the ends of the cable meet. Fig. 10 is a section of the same on the line $y$—$y$ of Fig. 9. Fig. 11 is a side view of the same, showing the cable. Fig. 12 is a top view of Fig. 11. Fig. 13 is a top view of another form of fastener to be used where the ends of the cable meet, showing the position of the cables therein. Fig. 14 is an end view of the same. Fig. 15 is a top view of one end of a conveyer furnished with fasteners as before described, but without cross slats. Fig. 16 is a side view of the same.

1, 1, are cross slats, which may be placed at a distance from each other as shown in Fig. 1 and have a netting, 2, resting upon them, secured to them by staples, 3, 3, or which may be placed close together, as shown in Figs. 4 and 5, and used without any netting merely as a slat conveyer. 4, 4, are the cables to which these slats are secured by the fasteners, 5, 6, 7. As shown most clearly in Figs. 6 and 7, the ordinary form of these fasteners (5) has a flat upper surface with a groove, 8, across it, a little shallower than the diameter of the cable to be fastened. There may be a projection, 9, in the center of this groove, or the groove or the under surface of the slat might in any other way be adapted to hold the cable more firmly, but we find that it is usually enough to depend upon the compression of the cable in a smooth groove, like that shown in Fig. 8. The fasteners are provided with holes, 10, 10, splayed at the bottom so as to give the screws, 11, 11, a grip. These screws engage with an interior screw thread in the recesses, 12, 12, in the slats, 1, and by turning up the screw, any desired amount of pressure can be got upon the cable 4. Fig. 8 shows the screw holes passing completely through the slats, instead of recesses. Either arrangement is allowable.

Figs. 9, 10, 11 and 12 show a form of fastener to be used where the ends of the cable meet. The two ends of the cable are inserted into the groove, 15, and are drawn down through the diagonal hole, 16, and pulled taut till they fit snugly around the angles 17, 17. The slat is then screwed tight and binds the cables at the points, 18, 18, leaving the parts 19 in the same straight line so that the strain of the cable does not twist the fasteners or slats. The difficulty with this arrangement is, that if wishing to tighten up one end of the cable we loosen the screw shown at the right hand in these figures, thus relieving the compression of the cable. The other end of the cable is similarly released. It will be observed however, that the side passage increases gradually in size from the point where it leads off from the main groove. Thus when the cable is gripped and compressed in the main groove, the portion of it lying in this widening or conical passage will act as a wedge and prevent even a considerable strain on the cable from drawing the end of the cable out of its fastening; while the grip thus maintained by the sloping surfaces is much less likely to chafe the cable than would be a sharp corner, such as is shown in the side passage in Bell's patent, No. 507,403, of October 24, 1893, and in Pond's, No. 372,637, of November 1, 1887.

In the fastener, 85, shown in Figs. 13 and 14, one end of the cable comes out through a hole at the left of the fastener and the other comes out at the right. Now if we wish to tighten or loosen the last mentioned end of the cable, we loosen the screw at the right, which relieves this end of pressure while at the same time the screw at the left still holds the other end of the cable.

In Figs. 2 and 3 is shown a form of roller to be used with the form of conveyer shown in Fig. 1. As the fastener is on the under side of the slat and as the recesses in the slats do not, or need not go clear through, the fasteners are not seen from the point of view taken in Fig. 1. The main part of the roller, 20, has grooves, 21, 21, into which the slats fit, thus allowing the apron to lie smoothly on the outer surface of the roller. At the end of the roller is a supplementary piece, 24, having depressions, 25, 25, lying in the same radial lines as grooves 21, and being of the right depths to receive the projecting parts of the fasteners. The roller might be made without the supplementary part 24, and the grooves, 21, might be depended upon to hold and drive the conveyer, but this supplementary part serves as a precaution against the slats jumping out of the grooves. 28 is the axis of the roller.

In Figs. 4 and 5 we have shown the form of pulley or roller here used with the slat conveyer, but capable of being used also with the netting or apron conveyer. The fasteners are put a little in from the ends of the slats, leaving enough of the slats projecting to run over the narrow rollers, 34, 34, while the center of the slats is or may be supported by a similar roller, 35, these rollers being mounted on a shaft, 40, suitably journaled. This construction has the advantage of simplicity and economy in structure, although not so positive in its action upon the endless conveyer.

When using supporting and driving rollers such as shown in Figs. 15 and 16, the cross-slats may be dispensed with, and a piece of metal or wood, 34, used which is only large enough to cap the fastener. The wire apron is laid over the cables, as best shown in Fig. 16, the fastener is introduced under the cable, the cap is laid on to correspond with the fastener, over the apron, and the whole thing is bound together by screws as before. This form of conveyer is designed to travel over a roller, 87, which is smooth except near its ends where it is made of smaller diameter (see 89) and provided with depressions, 88, corresponding in distance apart to the distance apart of the fasteners 84. The shaft of this roller is 90. Thus while the cross slats are lacking to hold the cables at the same distance apart, this roller performs the same function at the ends of the conveyer, and the sag which is possible in the center, that is, between the end rollers, is not very much. The two sides of the conveyer also are kept running at the same speed by the guidance of the depressions, 88, upon the fasteners 84. This form of fastening is exceedingly simple and easy to apply, and it will be seen that if we need to replace a broken or injured fastener, we can do so without disturbing any of the others on the conveyer, as could not be done if the cable ran through a hole in the fastener; an arrangement sometimes found. The fastener is in one piece and the liability of slipping or yielding and so letting the cable move is done away with.

What we claim as new and of our invention is—

1. In a conveyer the combination of an endless apron, cables for supporting said apron, plates with a groove less in depth than the diameter of the cables, said plates placed at intervals along the length of the cables upon one side of the apron, an opposing slat or plate for each grooved plate upon the other side of the apron, and means for drawing the said opposed plates together and thereby gripping the apron and cable between them.

2. In a conveyer the combination of an endless apron, cables to support the same, plates placed at intervals along the cables upon one side of the apron and having a groove less in depth than the diameter of the cables but adapted to receive them, an opposing slat or plate for each grooved plate, upon the other side of the apron, with means for drawing the opposed plates together, and rollers having depressions in their peripheries arranged to receive projecting portions of the said plates and thereby move and guide the conveyer.

3. In a conveyer the combination of an endless apron, cables to support the same, plates placed at intervals along the cables upon one side of the apron and having a groove less in depth than the diameter of the cables but adapted to receive them, an opposing plate or slat for each grooved plate, upon the other side of the apron, with means for drawing the opposed plates together, and rollers provided with depressions in their peripheries arranged to receive projecting portions of the said plates and otherwise smooth surfaces to support the apron when traveling around them.

4. In a conveyer the combination of supporting or driving cables, cross-slats, plates each provided with a transverse groove adapted to receive a section of a cable and one or more supplemental grooves or passages leading from said transverse groove for the ends of a cable, and means for securing each grooved plate to a cross-slat and thereby gripping the ends of the cable, substantially as described.

5. A device for holding together cable or rope ends, consisting of opposing plates one of which is provided with a transverse groove to receive a section of the cable and supplemental grooves or passages leading from said transverse groove, and means for securing or releasing either end of said cable independently of the other.

FREDERICK G. SARGENT.
ALLAN C. SARGENT.

Witnesses:
GEO. E. TALBOT,
GEO. F. IRISH.